Jan. 6, 1942.　　　　B. B. BERRY　　　　2,269,244
TIRE
Filed Nov. 25, 1938

INVENTOR.
BERNIE B. BERRY,
BY
ATTORNEYS.

Patented Jan. 6, 1942

2,269,244

UNITED STATES PATENT OFFICE 2,269,244

TIRE

Bernie B. Berry, Indianapolis, Ind.

Application November 25, 1938, Serial No. 242,137

3 Claims. (Cl. 152—342)

My invention relates to pneumatic tires, and has for its primary object the prevention of complete tire-collapse in the event of a blow-out or puncture. More specifically, it is my object to provide for a tire an inner tube divided into compartments by circumferentially extending partitions spaced axially of the tire and so constructed that either of them may serve as a temporary side-wall if the side-wall of the casing becomes damaged as the result of a blow-out or tear. Another object of my invention is to prevent intercommunication between the several chambers into which the inner tube is divided by the aforesaid partitions except during the period when the tube is being inflated.

In carrying out my invention, I form the inner tube with one or more annular partitions spaced axially of the tire to provide within the inner tube annular compartments or chambers desirably of approximately equal volume. These partitions are reinforced, as by including in each one or more layers of fabric. For the purpose of inflating the tire, I provide the inner tube with a valve stem having independently-valved passages communicating respectively with the tube-compartments, and associated with the valve stem I provide means for positively opening all the valves when the tire is being inflated. The valve stem is surrounded by a sleeve of soft rubber bonded to the valve stem; and such sleeve is provided with flanges engaging and vulcanized to the interior partitions, and one side-wall of the tube respectively.

Figure 1:
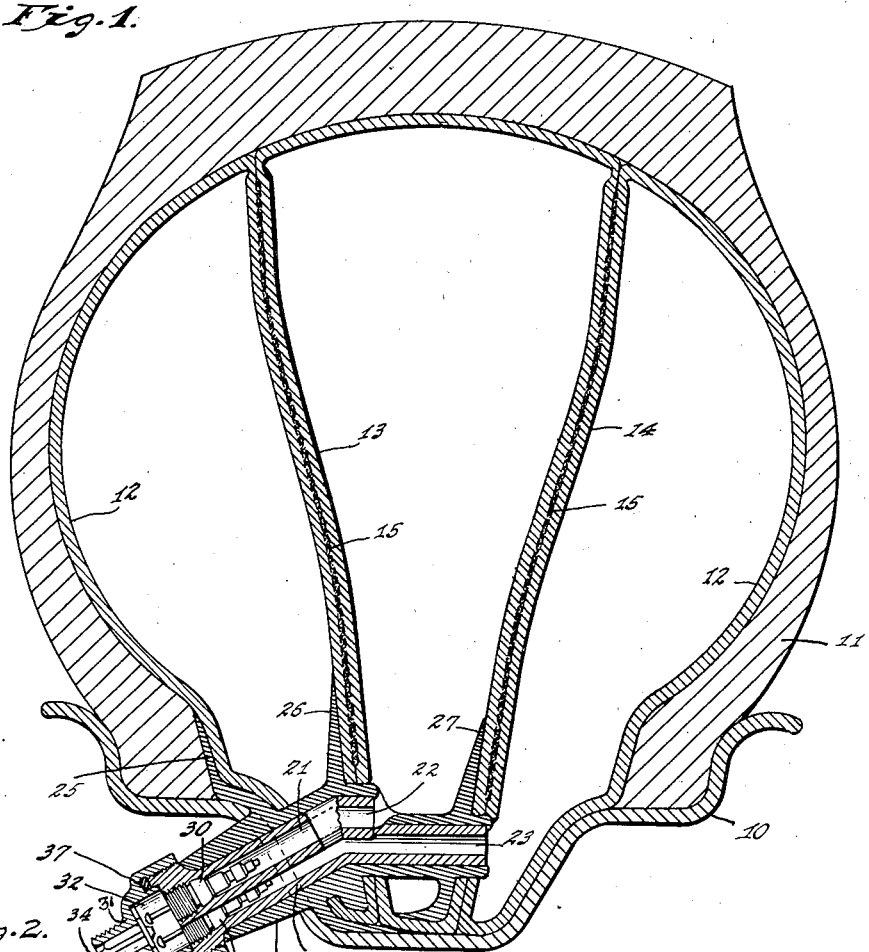
Figure 2:
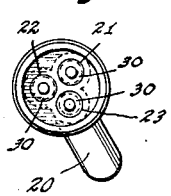
Figure 3:
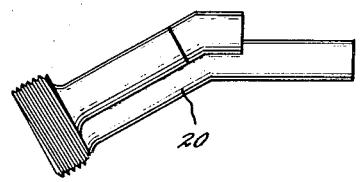
Figure 4:
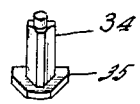

The accompanying drawing illustrates my invention: Fig. 1 is an axial section through a tire embodying my invention; Fig. 2 is a plan view of the valve assembly with the cover removed; Fig. 3 is an elevation of the valve body; and Fig. 4 is an isometric view of the valve-actuating member removed from association with the valve body.

In the arrangement illustrated in the drawing, the wheel-rim 10 carries a tire-casing 11 within which there is disposed an inner tube 12. Integral with the walls of the tube 12, I provide two annular partitions 13 and 14 dividing the interior of the tube into three compartments or chambers all of which preferably have approximately the same volume. As is clear from Fig. 1, the partitions 13 and 14 are desirably rather closely spaced near the inner wall of the tube 12 and diverge outwardly toward their respective points of junction with the outer wall of the tube. The partitions 13 and 14 and the walls of the tube 12 are all formed integrally, and one or both of the partitions have incorporated in them one or more layers of fabric 15. Conveniently, the tube is made of three separate tubular elements, the two side walls of the middle element being vulcanized respectively to the adjacent walls of the outer elements after the fabric 15 has been put in place.

The valve body 20 which I employ is desirably formed of metal and includes three longitudinally extending passages 21, 22, and 23 which communicate respectively with the three compartments into which the inner tube is divided by the partitions 13 and 14. Surrounding and bonded to the valve body 20 is a sleeve 24 of soft rubber or equivalent material. This sleeve is provided with outwardly projecting flanges 25, 26, and 27 which lie respectively against corresponding faces of the partitions 13 and 14 and the wall of the inner tube 12, each flange being vulcanized to the tube-part it engages.

Each of the passages 21, 22, and 23 in the valve body 20 is provided with a valve 30 which, as indicated, may be of conventional form. The valve body is provided with a cover 31, conveniently secured to the outer end of the valve stem by screw-threads and provided with an inwardly opening recess or chamber 32 into which the valve stems of the valves 30 extend. The valves are arranged so that their valve stems all extend into the chamber 32 for approximately the same distance. The cover 31 is provided with a neck 33 having an axial passage within which is mounted the shank of a valve-operating member 34, such valve-operating member having within the chamber 33 a flange 35 large enough to overlie the ends of the valve stems. The shank and flange of the valve-operating member 34 are relieved at intervals about their circumference to provide for the passage of air; and the shank desirably extends outwardly beyond the end of the neck so that it can be manually moved inwardly to open the valves. The neck may be provided exteriorly with screw threads for the reception of the conventional valve-cap (not shown).

The cover 31 is provided interiorly with a concentric annular flange 37 spaced inwardly from the cylindrical side wall of the cover to provide an annular pocket filled with compressible packing material 38 acting as a gasket to prevent escape of air when the tire is being inflated. Desirably, the flange 37 is somewhat smaller in diameter than the outer end of the valve-body 20, and the outer end of such valve-body is provided with a shallow central recess to leave an annular flange 39 which receives the flange 37 within it. The flange 37, engaging the bottom of the recess in the outer end of the valve-body 20, limits compression of the gasket 38 and thus makes it impossible for the cover 31 to be screwed on the valve-body 20 so far that the valves 30 will be opened.

To inflate the tire, air under pressure is admitted through the neck 33 and enters the three compartments of the inner tube by way of the passages 21, 22, and 23 in the valve-body. During admission of air, the valves in the respective passages 21, 22, and 23 are open, with the result that all three compartments of the inner tube will be inflated to substantially the same pressure. When inflation is completed, the valves 30 seal each of the tube-compartments individually; and therefore a puncture or blow-out which ruptures any wall of one compartment will not result in escape of air from either of the other two compartments. Should any of the valves 30 stick in closed position, they can be released by inward movement of the valve-operating member 34, the flange 35 of which engages the outer ends of the respective valve-stems and moves them inwardly.

The fabric reinforcement 15 provided in each of the partitions 13 and 14 is of material value in permitting continued operation of the tire in event of a blow-out or large tear in one of the side-walls of the tire. Any such rupture of the side wall of the tire will permit the escape of air from the adjacent compartment within the inner tube. Air will not escape from the other compartments, however, and the pressure therein will force the adjacent partition into contact with the ruptured side-wall of the tire, the fabric reinforcement preventing the unsupported partition from blowing out. To minimize any distortion of the tube which may be necessary to permit either of the partitions 13 and 14 to lie against a side wall of the tire, I prefer to make such partitions wide enough so that they will not be stretched taut when the tire inflated.

I claim as my invention:

1. In a pneumatic tire, an inner tube, one or more annular partitions disposed within said tube and dividing the interior thereof into compartments, said tube and partitions being formed of rubber, a valve body having passages communicating respectively with said compartments, and a rubber sleeve bonded to said valve body and provided with integral outwardly extending flanges vulcanized respectively to said partitions and to one wall of said inner tube.

2. In a pneumatic tire, an inner tube, one or more flexible annular partitions generally parallel to the median plane of said tube and dividing the interior thereof into compartments, a valve body of rigid material extending generally perpendicularly to the median plane of the tube through the wall thereof and through each of said partitions, said valve body being provided with a plurality of longitudinal passages communicating respectively with said compartments and extending through the valve body to a point outside the tube.

3. The invention set forth in claim 2 with the addition of a rubber sleeve surrounding and bonded to said valve body and vulcanized to the tube wall and partitions through which the valve body passes.

BERNIE B. BERRY.